United States Patent [19]
Forler

[11] Patent Number: 4,952,257
[45] Date of Patent: * Aug. 28, 1990

[54] LAMINATION REPAIR METHOD

[75] Inventor: C. Richard Forler, St. Petersburg, Fla.

[73] Assignee: E-P Corporation, St. Petersburg, Fla.

[*] Notice: The portion of the term of this patent subsequent to Oct. 25, 2005 has been disclaimed.

[21] Appl. No.: 205,202

[22] Filed: Jun. 10, 1988

Related U.S. Application Data

[63] Continuation-in-part of Ser. No. 789,347, Oct. 21, 1985, which is a continuation of Ser. No. 704,896, Feb. 22, 1985, abandoned, which is a continuation of Ser. No. 546,809, Oct. 31, 1983, abandoned, which is a continuation of Ser. No. 413,079, Aug. 30, 1982, abandoned.

[51] Int. Cl.$^5$ .............................................. B32B 35/00
[52] U.S. Cl. ....................................... 156/94; 425/12; 425/13
[58] Field of Search ................. 156/94, 254, 286, 293, 156/344; 425/12, 13

[56] References Cited
U.S. PATENT DOCUMENTS
4,780,162 10/1988 Forler et al. .......................... 156/94

Primary Examiner—Jay H. Woo
Assistant Examiner—Timothy W. Heitbrink
Attorney, Agent, or Firm—Dominik, Stein, Saccocio, Reese, Colitz & Van Der Wall

[57] ABSTRACT

A repair method for repairing electrical interconnect between an electrical bus bar and an electrically conductive ply of a heatable laminate. The method uses the steps of filling a syringe with an electrically conductive material, inserting the needle of the syringe into the laminate parallel to the conductive ply and along the surface thereof until the needle reaches the interconnect and then operating the syringe to inject an amount of the material into an area about the conductive ply.

4 Claims, 5 Drawing Sheets

LAMINATION REPAIR METHOD

CROSS REFERENCE TO RELATED APPLICATIONS

This application is a continuation in part of Ser. No. 789,347 filed Oct. 21, 1985, now U.S. Pat. No. 4,780,162, which is a continuation of Ser. No. 704,896 filed on Feb. 22, 1985, now abandoned, which is a continuation of Ser. No. 546,809, filed on Oct. 31, 1983, now abandoned, which is a continuation of Ser. No. 413,079, filed Aug. 30, 1982, now abandoned.

BACKGROUND OF THE INVENTION

1. Field of the Invention

This invention relates to methods for repairing aircraft window laminates comprising two or more plies of the same or different material. More particularly, this invention relates to methods for introducing an adhesive in the delaminated area between the plies which have become separated. This invention also relates to methods for repairing electrically conductive plies and heat control sensors of laminates.

2. Description of the Background Art

A laminate is a composition of materials which usually includes three or more plies of material; typically, two or more layers of material having the desired characteristics and an adhesive layer which bonds such nonadhesive layers together. The aspect of bonding two materials together, each material having the same or different characteristics, can yield a laminate which is much more desirable for a particular purpose than a sheet of homogeneous material. Accordingly, the use of laminates has proliferated in the past and will continue to proliferate for many years to come.

One major disadvantage to laminates is their tendency to delaminate under certain conditions or after a certain length of time. Upon delamination, the desired characteristics of the laminate (strength, durability, light transmittance characteristics, etc.) are substantially and adversely effected. Further, once the delamination forms, it rapidly spreads throughout the entire laminate. These problems are so acute in the industry that it is common practice to virtually replace the entire laminate even when only two plies have become delaminated. Obviously, the requirement for replacing the entire laminate is extremely costly not only from the pure expense involved but also with respect to down time of the apparatus which utilizes the laminate.

Various efforts have been made to repair a delaminated laminate. Those efforts have basically included methods for cutting into the laminate to remove the delaminated area and then rebonding a new section of a laminate or homogeneous material in the opening thus formed. The other methods have included various techniques for bonding a patch over the delaminated area, or affixing a patch about the delaminated area by means of rivets or other fasteners. Some techniques have included a combination of both bonding and affixing of the patch about the delaminated area. When the delaminated area includes a perforated area, it is common practice to adhere a sheet of fiberglass material over the patch to prevent contamination and moisture from passing through the perforation.

A particular type of industry in which laminates are widely used, is the transparency industry for making aircraft windows and the like. In this particular industry, the aircraft window typically comprises two to five plies of an acrylic material which are bound together by interposed adhesive plies. A scratch resistive ply, such as glass, is then affixed to the opposing side of the acrylic plies by similar adhesive plies. Usually, an electrically conductive ply is meshed between the outer glass ply and the outer-most acrylic ply to enable electrical current to flow therethrough to heat the window to a particular temperature as determined by a heat control sensor, thereby preventing ice formation on the window during flight.

The primary disadvantage to transparency laminates is their tendency to delaminate about their peripheral edges within two to five years of service. The delamination at the edges of the transparency quickly grows to such a point that the transparency has to be discarded and a new one reinstalled. It is contemplated that this delamination occurs at such an early stage due to the inherent environment in which the aircraft are exposed; namely, jet fuel contaminates and moisture ingress through seals of the frame, extreme temperatures and a certain amount of flexing of the laminate.

Another disadvantage to transparency laminates, particularly aircraft laminates, is that the degradation of the electrical interconnect between the electrical buss bars and the electrically conductive ply. Usually, upon sufficient degradation, arching occurs between the buss bars and the electrically conductive ply causing non-uniform power gradient throughout the electrically conductive ply. Thus, "hot spots" are created at various portions of the electrically conductive ply. Moreover, electrical arching occurs between the buss bars and the electrically conductive ply thereby also creating "hot spots" along the interconnection. Excessive heat at such "hot spots" can become so severe that the acrylic plies are damaged. Clouding of the acrylic plies usually also results.

Finally, another disadvantage of aircraft window laminates is the usual failure of the heat control sensor which controls the amount of power flowing to the electrically conductive ply. Since the heat sensor is imbedded in the laminate, the failure of the sensor usually results in discarding the entire laminate.

It is an object of this invention to provide an improved method which overcomes the aforementioned inadequacies of the prior art methods an provides an improvement which is a significant contribution to the advancement of the art of repairing laminates.

Another object of this invention is to provide a method for repairing laminates in which the delaminated plies are adhesively bound together to substantially achieve the original characteristics of the laminate.

Another object of this invention is to provide a method for repairing laminates which can be performed at a cost substantially less than the original cost of the laminate.

Another object of this invention is to provide a method for repairing laminates in which an adhesive, compatible with the adjoining plies, is introduced into the delaminated area.

Another object of this invention is to provide a method for repairing a laminate which eliminates the need to cut into the laminate and remove the delaminated area.

Another object of this invention is to provide a method for repairing a laminate which eliminates the need to apply a patch to the delaminated area in order to repair the same.

Another object of this invention is to provide a method for repairing a laminate in which the laminate has become delaminated about its peripheral edges.

Another object of this invention is to provide a method for repairing transparency laminates commonly used in the aircraft industry.

Another object of this invention is to provide a method for repairing aircraft transparency laminates without adversely effecting the electrical heating ply positioned within the transparency laminate.

Another object of this invention is to provide a method for repairing the electrically conductive ply of an aircraft transparency laminate to increase the uniformity of the power gradient across the ply thereby minimizing "hot spots" in the laminate.

Another object of this invention is to provide a method for repairing the electrical interconnect between the buss bars and the electrically conductive ply of an aircraft transparency laminate.

Another object of this invention is to provide a method for installing a new heat control sensor to substitute for the original, now defective, heat control sensor of an aircraft transparency laminate.

Another object of this invention is to provide a method for positioning the heat control sensor of an aircraft transparency laminate to one of the hotter areas of the laminate so that the laminate is not damaged from overheating.

The foregoing has outlined some of the more pertinent objects of the invention. These objects should be construed to be merely illustrative of some of the more prominent features and applications of the intended invention. Many other beneficial results can be attained by applying the disclosed invention in a different manner by modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention relates to methods for repairing laminates. Basically, one method of the invention utilizes one or more techniques for introducing an amount of an adhesive into the delaminated area of the laminate to full substantially all of the void within the delaminated area thereby repairing the laminate. The adhesive which is introduced into the delaminated area should have a viscosity sufficient to flow into the void. The specific techniques of the method of the invention are primarily concerned with the manner in which the adhesive is introduced into the delaminated area to completely fill the same, such that the laminate will be restored to its original condition.

More particularly, the techniques of the delamination repair method of the invention are described in respect to the repair of transparent laminates such as aircraft windows and the like. With respect to aircraft transparency laminates, the delamination typically occurs about the peripheral edges due to the contaminants in the air, such as jet fuel contaminants and moisture ingress through the seal of the frame, extreme temperature variations among the various plies of the laminate, pressure differentials existing between the interior and exterior of the aircraft, and the general environment in which the aircraft windows are usually serviced and maintained. The preferred technique of the method of the invention contemplates the selection of an adhesive which has a viscosity sufficient to flow into the void of the delaminated area and then introducing such adhesive by means of a syringe and hypodermic needle combination, into the void until the void is substantially or completely filled with the adhesive. Additional adhesive is forced into the delaminated area as the needle is withdrawn such that the channel formed by the needle is also filled with the adhesive. The other techniques contemplated by the delineation repair method of the invention accomplish the same result, and may be more desirable than the preferred technique for some manufacturers.

The other method of the invention comprises techniques for repairing the electrical interconnect between the electrical buss bars and the electrically conductive ply of the laminate and for installing a new electrical heat control sensor to substitute for a defective sensor for controlling the amount of electrical power flowing to the electrical buss bars. More particularly, the electrical buss bar repair method comprises the steps of forming a hole between the plies of the laminate to the area of the buss bar and then injecting an electrically conductive epoxy or other material into the area of the buss bar by means of a syringe and hypodermic needle. Upon curing, the electrically conductive epoxy forms a low resistance electrical interconnect between the buss bar and the electrically conductive ply.

The substitution of the defective electrical heat control sensor is accomplished by milling a slot from an electrical terminal connector positioned in the outer edge of the laminate to an area adjacent to the location of the new sensor. A cylindrical blind hole is drilled from the outer edge of the laminate between the plies, preferably between the same plies that the original, now defective, sensor was installed. A new sensor is then installed in the hole thus formed and the hole is back filled with an epoxy adhesive.

Preferably, the heat control sensor comprises a thermister-type sensor composed of a strand of resistive wire whose resistance changes in inverse proportion to its temperature. Also preferably, the resistive wire is wound in a spiral having a diameter less than the diameter of the blind hole such that the spiral wound resistive wire can be inserted into the hole with both leads brought out. The leads of the defective sensor are disconnected and the leads of the new sensor are then electrically connected to the original connector or to a new connector positioned transversely through the laminate. The sensor may then be electrically connected to the aircraft's monitoring control system.

It is noted that back-up sensors may similarly be positioned in the laminate as needed. Moreover, the heat control sensor may be positioned at the hottest portion of the laminate about its periphery to assure that the laminate will not be damaged from over heating.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception of the specific method disclosed may be readily utilized as a basis for modifying or designing other methods for carrying out the same purpose of the present invention. It should also be realized by those skilled in the art that such equivalent methods do not depart from the spirit and scope of the invention as set forth in the appended claims.

BRIEF DESCRIPTION OF THE DRAWINGS

For a fuller understanding of the nature and objects of the invention reference should be had to the following detailed description taken inn connection with the accompanying drawings in which.

Similar reference characters refer to similar parts throughout the several drawings.

DETAILED DESCRIPTION OF THE PREFERRED EMBODIMENT Delamination Repair Method

Figure 1:
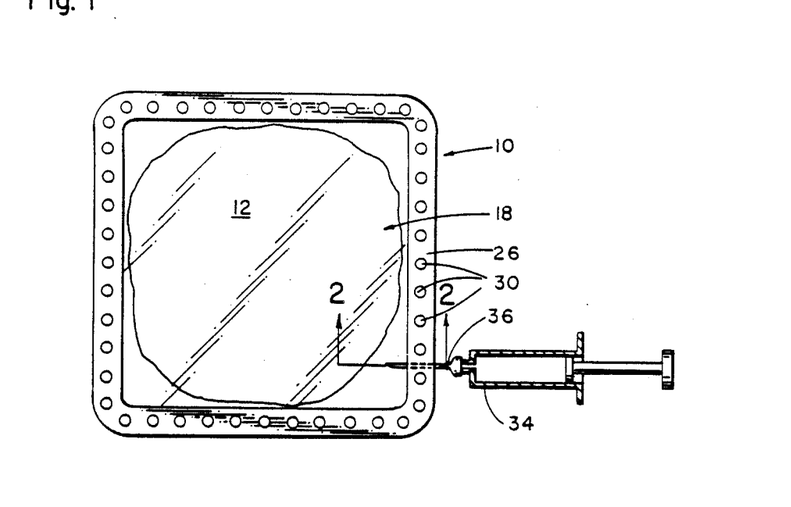
FIG. 1 is a plan view of an aircraft window illustrating the manner in which the syringe and hypodermic needle combination is inserted through the seal member into the void of the plies of the laminate which have become separated.
Figure 2:
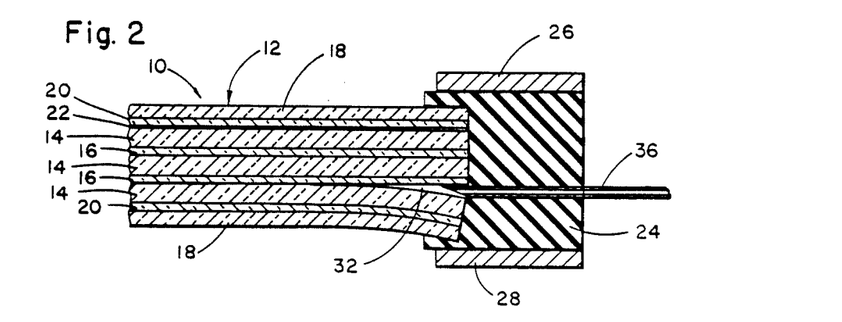
FIG. 2 is a cross-sectional view of FIG. 1 along lines 2—2 illustrating the end of the hypodermic needle positioned within the void of the delaminated area.

Referring to FIGS. 1 and 2, a typical aircraft window 10 comprises a transparent laminate 12 having several acrylic plies 14 adhered together by means of corresponding adhesive plies 16. A scratch resistant ply 18, such as glass, is adhered to the exposed surfaces of the acrylic plies 14 by similar adhesive plies 20. Usually, an electrically resistive ply 22, formed by vapor deposition or through the use of resistive wires, is positioned between the exterior glass ply 18 and the outermost acrylic ply 14. When the electrical energy is applied thereto, the outer glass ply 18 is heated to a temperature sufficient to prevent ice formation about the exterior of the aircraft window 10.

A seal member 24 is positioned about and overlaps the peripheral edge of the laminate 12. A pair of opposing frame members 26 and 28 are positioned about opposing sides of the seal member 24 in order to provide rigidity thereto. Finally, spacers 30 are inserted through holes in the frame member 26 and 28 and the seal member 24. The spacers 30 function to receive the fastener which affixes the window 10 into position, while preventing damage to the laminate 12 due to over-tightening of the fasteners.

After the aircraft window 10 is in service for two to five years, sometimes earlier, the transparent laminate 12 begins to delaminate about portions of its periphery, usually the corners. Experience has indicated that once the delamination begins, the rate of delamination steadily increases with time. In fact, as a general rule, the rate of delamination is directly proportional to the size of the delamination. The delamination can become so severe that the outer glass or acrylic plies 18 and 14 become separated from the other plies during flight. Of course, this is potentially a very hazardous condition. Additionally, it is noted that the aircraft pilot's performance could be compromised if the delamination were permitted to extend into his/her field of view.

The method of the invention for repairing the aircraft window 10 includes the steps of selecting an additional adhesive having a viscosity sufficient to flow into the void of delaminated area 32 formed between two separated plies, and then introducing an amount of such additional adhesive into the delaminated area 32 until the void of the delaminated area 32 is substantially or entirely filled with the additional adhesive. The window 10 will then be repaired to a substantially new condition.

Obviously, it is important to select an adhesive which is compatible with the materials constituting the plies of the laminate 12. The following is a list of some physical and chemical properties of adhesives which may be suitable depending on the particular materials constituting the plies. The adhesive, as noted earlier, should have viscosity such that it is readily dispensed and flows easily into the delaminated areas and remains bubblefree throughout the process. The adhesive should completely wet all contacted surfaces. For transparent applications such as aircraft windows, the adhesive should have high light transmission, low color and low haze and be capable of retaining such optical properties throughout its service. The adhesive should be compatible with all the materials constituting the plies in which it is contacted; typical plies for an aircraft window 10 comprising materials such as glass, acrylic, polycarbonate, polyvinyl butyral, polyurethane, silicone elastomeric inter layers, and conductive coatings such as gold, tin-oxide, and indium tin oxide. The adhesive must provide sufficient adhesion to each material such that an acceptable bond is provided and subsequent delamination is eliminated. If used on the electrically heated ply 22, the adhesive should have a resistance greater than the resistance of the heating ply 22 such that the heating characteristics of the ply 22 will not be affected. Preferably, the adhesive can react-cure (polymerize) without any external aids such as increased temperature or ultra violet radiation. The adhesive should completely react without any exothermic reaction, evolution of volatiles, and with minimal shrinkage. The adhesive should be resistant to the effects of moisture and other contaminants that may be present within the delaminated window and, after curing, should be resistant to ultra violet radiation, moisture, contamination, and depressed and elevated temperatures. The adhesive should not degrade (discolor, crack, etc.) or lose adhesion after severe thermal shock or for mechanical stresses imposed in service. With respect to nontransparent applications, the adhesive may be reinforced (strengthwise) by incorporating appropriate fillers such as silica, corborundum, metallic powders and carbon or boron fibers. Where necessary, the adhesive may be modified by the addition of compatible solvents or plasticisers. Typical chemical types of the adhesive that may be used are based on, but not necessarily limited to, monomers of acrylic, polyester, urethane, epoxy, silicone or derivatives of the same.

It is understood that any liquid monomer adhesive can be used, provided that after polymerization, the end-product meets the above-described requirements. However, for the purposes of the claims appended hereto, the term "adhesive" is defined to mean any substance which functions to adhere the delaminated plies together when the substance is introduced therein and shall not be limited, unless so claimed, to those substances which include any or all of the above-listed characteristic.

The following is a discussion of the preferred and other techniques for introducing the adhesive into the delaminated area 32 such that the adhesive completely fills or substantially fills all of the voids therein.

Preferred Technique

The preferred technique for introducing the adhesive into the delaminated area 32 comprises first, heating the laminate 12 in a hot air bath or by applying electrical energy to the heating ply 22 enabling it to heat itself. The laminate 12 should be heated to an appropriate temperature to soften the selected plies to be repaired. The laminate 12 is then checked for noticable openings around the seal member 24 and the frame members 26 and 28. If any noticable openings are located they should be sealed with either tape or a caulking sealant such that the adhesive, once introduced into the delaminated area 32, is prevented from leaking therefrom until it is sufficiently cured. Additionally, the sealing of the noticable openings prevents air from intruding back into the delaminated area 32 as the adhesive is introduced therein.

After the laminate is heated and its noticable openings sealed, the proper seam and level (plies) of the laminate 12 where the delamination has occurred is located. A small opening is made in the seal member 24 in a position between the delaminated plies. A syringe 34 is filled with the adhesive. If any air becomes trapped in the syringe 34, it is removed by inverting the syringe 34 and forcing the air bubble out the needle 36. The syringe 34 is then fitted with a hypodermic needle 36.

The needle 36 is then threaded through the opening in the seal member 24 and forced into the delaminated area. It is noted that if the delamination does not extend to the edge of the laminate 12, the needle 36 may be forced between the plies until it reaches the area of the delamination.

The plunger of the syringe 34 is then operated to force the adhesive to flow into the delaminated area 32. If it becomes necessary to refill the syringe 34 with the adhesive, approximately one-eighth of a cubic centimeter is left in the syringe 34 and the syringe 34 is disconnected from the needle 36 such that the needle 36 remains between the plies. After the syringe 34 is refilled with the adhesive, it is properly fitted to the needle 36.

If any air has entered into the needle 36, the plunger of the syringe 34 is pulled outward to draw out any such air that may have entered the needle 36. The syringe 34 is again operated to force the adhesive into the delaminated area 32.

If it appears that the void of the delaminated area 32 is not filling properly, the plunger of the syringe 34 may be pulled back to draw both the trapped air and some adhesive from the void. This enables the remaining adhesive to flow in behind to displace the air. Additionally, the laminate 12 may be elevated such that the air contained within the void is caused to rise to the top of the laminate 12 while the adhesive flows in behind to displace the air. This process can be enhanced by drawing back on the plunger of the syringe 34 until the air is drawn up into the syringe 34. Alternatively, or in combination with the foregoing, an empty syringe and needle combination :nay be inserted into another area of the delaminated area 32 and operated to draw therein the air contained in the delaminated area 32.

After the void is filled or substantially filled with the adhesive, the needle 36 of the syringe 34 is slowly withdrawn while slowly forcing the adhesive out of the syringe 34 to fill the opening behind the needle. This seals all openings and prevents any air intrusion.

Technique Number 2

Figure 3:
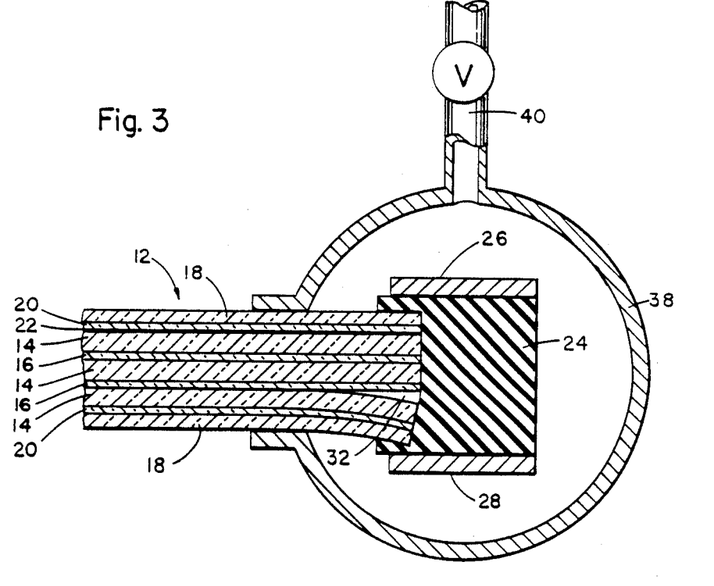
FIG. 3 is a partial cross-sectional view of the ring seal of the invention positioned about the edge of the aircraft window.

Referring to FIG. 3, the second technique for introducing the adhesive into the void formed by the delamination, comprise the steps of affixing a ringseal 38 about all or a portion of the periphery of the window 10. An input conduit 40 is then connected in fluid communication with the interior of the ringseal 38 at one portion of the ringseal 38, and an output conduit (not shown) is similarly connected in fluid communication with the interior of the ringseal 38 at another portion thereof. The adhesive is then forced into the ringseal 38 via input conduit 40 while the output conduit is opened to permit the air to escape therefrom. When the ringseal 38 is substantially full of the adhesive, the output conduit is closed. As the adhesive is further forced into the ringseal 38, the air trapped within the delaminated area 32 will be forced therefrom via leaks in the seal member 24, thereby permitting the adhesive to flow therein. When it appears that the void of the delaminated area 32 has been filled or substantially filled with the adhesive, the excess adhesive is drained from the ringseal 38 via input 40 and output conduits. The ringseal 38 is then removed from the peripheral edge of the window 10.

Technique Number 3

Figure 4:
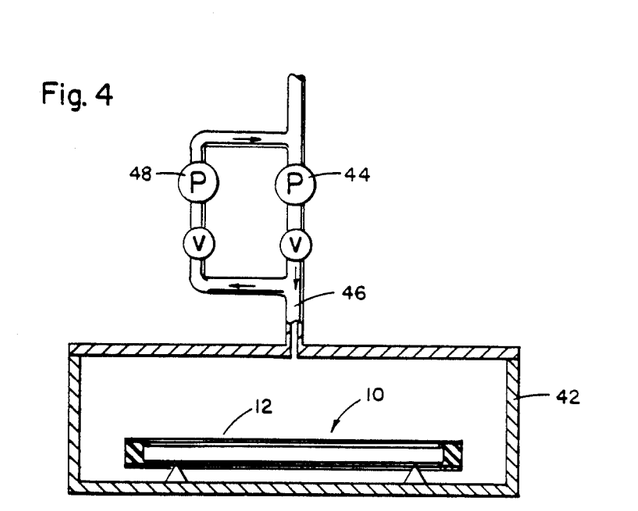
FIG. 4 is a partial cross-sectional view of the chamber in which the aircraft window is positioned to accomplish one particular technique of the method of the invention.

The third technique for introducing the adhesive into the void of the delaminated area 32, comprises covering, to prevent getting adhesive all over the window 10, and sealing, to prevent creation of additional voids, the laminate 12 except where the delamination area extends to the outer peripheral edge of the laminate 12. The laminate 12 is then put into a vacuum chamber 42 and vacuum is drawn down to 27 to 28 inches of mercury. This functions as a dryer to remove any moisture that may be present within the delaminated area 32. After vacuum has been drawn and the laminate 12 sufficiently dried, the chamber 42 is completely filled with the adhesive by a pump 44 and input conduit 46. While the chamber 42 is completely full with adhesive, pump 48 is operated to pump approximately 10% of the volume of the chamber 42 back into the reservoir containing the adhesive. This creates a vacuum within the chamber and correspondingly, a vacuum in the void of the delaminated area. The air trapped in the void is therefore encouraged to flow out of the laminate 12 by virtue of the force of the adhesive being drawn into the void. This procedure is repeated several times until the delaminated area 32 has been completely filled with the adhesive, at which time all of the adhesive is drawn from the chamber 42 and the laminate 12 removed.

Technique Number 4

Figure 5A:
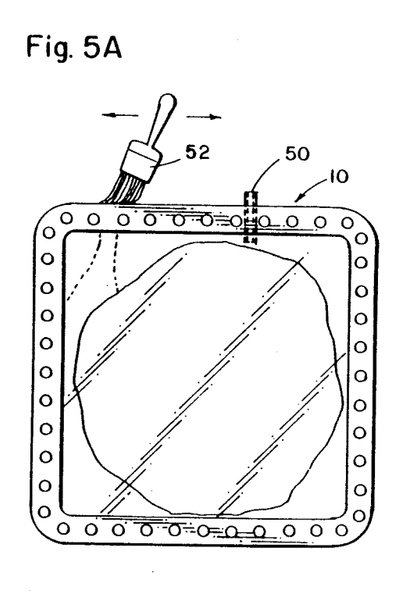
FIGS. 5A, B and C are schematic illustrations of another technique of the method of the invention which utilizes capillary action to introduce the adhesive into the void of the delaminated area.
Figure 5B:
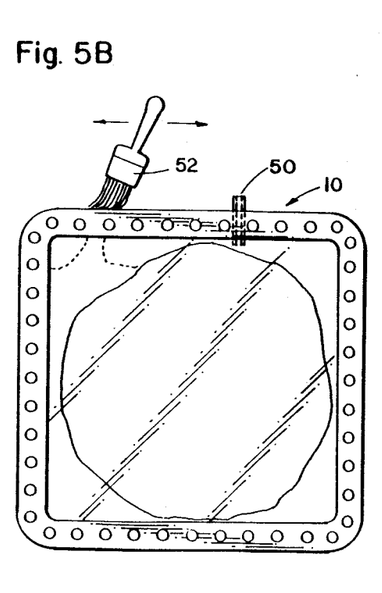
Figure 5C:
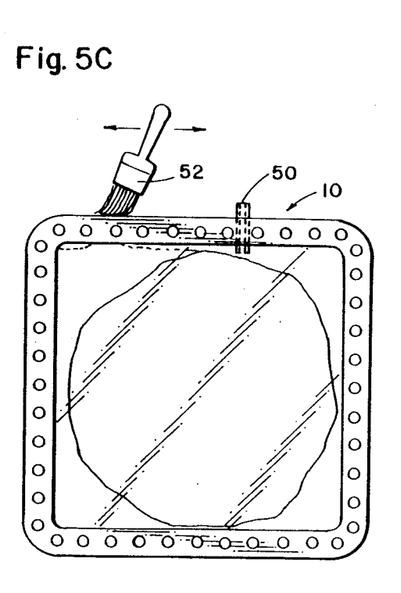

The fourth technique of the method of the invention for introducing the adhesive into the delaminated area 32 is illustrated in FIGS. 5A, 5B and 5C. Basically, this technique comprises the step of providing an air outlet 50 at the peripheral edge of the laminate 12. A brush 52, soaked with the adhesive, is brushed across the opening of the separate plies such that the adhesive is allowed to fill the void therein by capillary action. As the brush 52 is repeatedly soaked with adhesive and brushed across the opening, the air outlet 52 permits the air to escape from the void. When the void is completely filled with adhesive, the air outlet 50 is removed.

Technique Number 5

Figure 6:
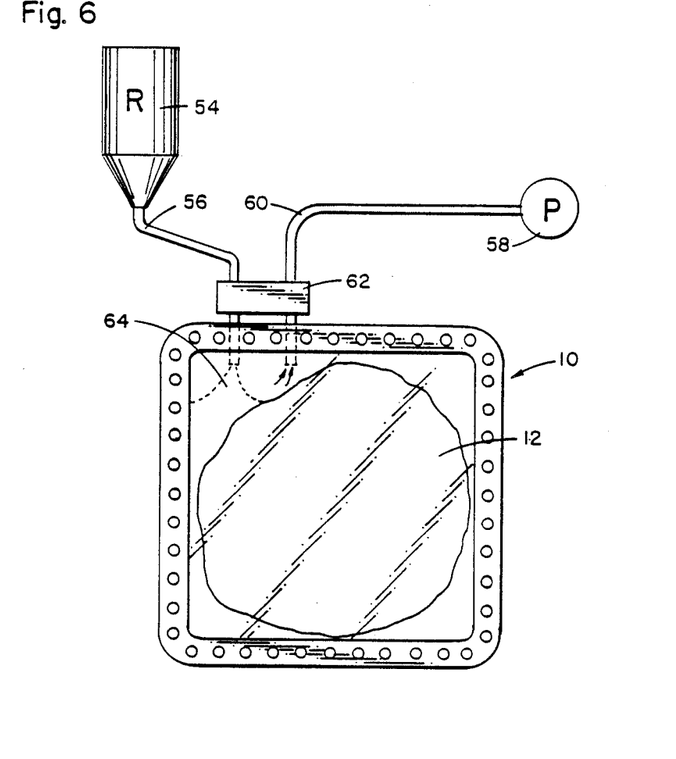
FIG. 6 is a schematic representation of the fifth technique for introducing the adhesive into the void of the delaminated area.

FIG. 6 illustrates another technique for introducing the adhesive into the void of the delamination. More particularly, this fifth technique comprises a reservoir 54 which is filled with the adhesive. The reservoir includes a conduit 56 which extends downwardly therefrom. A vacuum pump 58 is provided with a similar conduit 60. The two conduits 56 and 60 are rigidly affixed together by means of an applicator/connector 62. During use, the ends of the conduits 56 and 60 are forced through the peripheral edge of the laminate 12 into the void of the delamination 32. The entire opened surface of the void is then sealed with a sealant 64. Vacuum pump 58 is operated to draw the air contained within the void therefrom, at which time the adhesive contained within the reservoir 54 flows into the void. When the void is filled with the adhesive, the applicator/connector 62 is removed.

Technique Number 6

Figure 7:
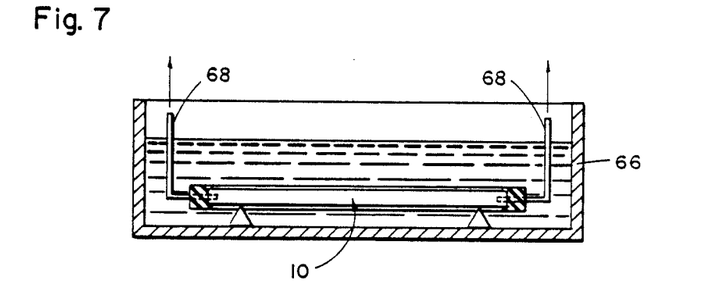
FIG. 7 is a cross-sectional view of the ultrasonic container in which the aircraft window is immersed and subject to ultrasonic vibrations.

As shown in FIG. 7, the sixth technique comprises submerging the laminate 12 into a container 66 containing the adhesive. Conduits 68 are connected to be in fluid communication with the voids of the delaminated areas 32 of the laminate 12 and extend above the surface of the adhesive. The adhesive and correspondingly, the laminate 12 are subjected to ultrasonic waves. Such wave motion encourages the air trapped within the voids of the delaminated areas 32 to escape therefrom, thereby permitting the adhesive to enter and fill the voids of he delaminated areas 32. It is noted that the wave action produced by the ultrasonic waves enhances the introduction of he adhesive into the voids of the delaminated areas 32.

The foregoing has described the various techniques of the method of the invention in relation to an aircraft window 10. It shall be understood that the description of such techniques were for illustrative purposes only. Many other techniques for introducing the adhesive into the voids of the delaminated areas may be utilized without departing from the spirit and scope of this invention. Additionally, it shall be understood that the techniques of the method of the invention may be utilized to repair any type of laminates 12 in addition to aircraft windows 10.

Electrically Conductive Ply Repair

Figure 8:
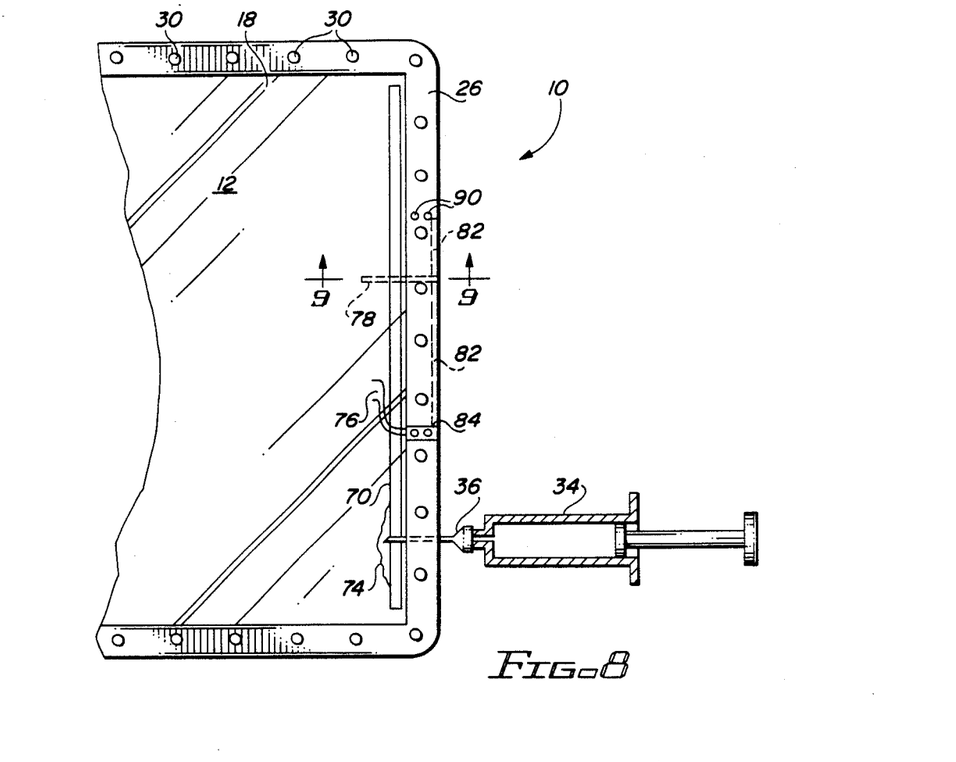
FIG. 8 is a partial plan view of an aircraft window illustrating new, substitute electrical control sensors positioned therein and the additional electrically conductive adhesive injected into the laminate about the buss bar to form an electrical interconnect between the buss bar and the electrically conductive ply.
Figure 9:
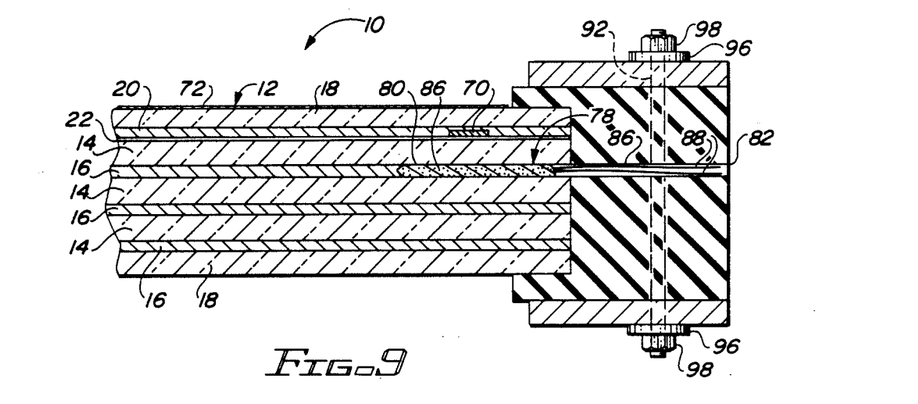
FIG. 9 is a partial cross-sectional view of FIG. 8 along lines 9—9.

FIGS. 8 and 9 comprise a plan view and an enlarged cross-sectional view of aircraft transparency laminate 12 illustrating the electrical interconnection between the buss bar 70 and the electrically conductive ply 22. As shown, the electrically conductive ply 22 comprises a thin metal or metalized layer which is typically vapor deposited on the surface of one of the acrylic plies 14. The electrical buss bar 70 is positioned at opposing sides of the laminate 12 along its edges and seats against the electrically conductive ply 22 to form an electrical interconnect therewith. Typically, the electrical interconnect is formed soley by the pressure applied to the electrical buss bar 70 by the other plies 14 against the electrically conductive ply 22.

During the lifetime of the laminate 12, it is not uncommon for the electrical interconnect between the buss bar 70 and the electrical ply 22 to degrade because of contamination entering into the laminate's edges such that the electrical interconnect's resistance substantially increases. Actual loss of interconnect between the buss bar 70 and the electrically conductive ply 22 may eventually occur. The increase in resistance at the point of interconnect creates a "hot spot" along the longitudinal length of the buss bar 70. Furthermore, the loss of interconnect between the buss bar 70 and the electrically conductive ply 22 usually results in electrical arching between the buss bar 70 and the electrically conductive ply 22. Upon arching, excessive heat build-up is created at the point of arching. In each case, whether it be an increase in resistance or arching, the creation of excessive "hot spots" may actually damage the other plies 14 or 16 of the window transparency laminate 12 and typically results in impaired visibility through the laminate itself.

The repair method of the invention for repairing the electrical interconnect between the electrical buss bars 70 and the electrically conductive plies 22 comprises the first step of applying a heat sensitive, color changeable material 72 to the surface of the aircraft transparency laminate 12 and then applying electrical power to the electrical buss bars 70 to heat the laminate 12. As the color of the material 72 changes with the increase in the temperature, photographs are taken as a record of the location of the "hot spots" at the areas of the electrical buss bars 70.

A new electrical interconnect between the electrical buss bars 70 and the electrically conductive ply 22 is formed through the use of an electrically conductive fluid such as an electrically conductive epoxy 74. More particularly, a syringe 34 is filled, or partially filled, with the electrically conductive fluid 74 and a hyperdermic needle 36 is affixed to the end of the syringe 34. The hyperdermic needle 36 is inserted through the seal member 24 of the laminate 12 between the plies 14 in alignment with the electrical buss bar 70 such that the hyperdermic needle 36 moves over the electrical buss bar 70 to the area proximate to the original interconnect between the buss bar 70 and the electrically conductive ply 22. The syringe 34 is operated to inject a quantity of the electrically conductive fluid 74 into the area proximate to the electrical buss bar 70 such that the fluid flows about the electrical buss bar 70 and the upper surface of the electrically conductive ply 22. The step of injecting the fluid 74 into the area of the electrical buss bar 70 is repeated about the length of the buss bar on both side edges of the laminate 12.

It is noted that the photographed record of the "hot spots" previously made may be used as a guide to determine the amount of electrically conductive fluid 74 to be injected into the areas of the electrical buss bars 70. Thus, additional fluid 74 may be injected in those areas which were indicated to be "hotter" than the other areas in an effort to compensate for the electrical interconnect between the buss bar 70 and the electrically conductive ply 22. Uniform low resistance is more likely to be optimized across the length of the electrical buss bar. Hence, a uniform power gradient can be achieved.

Electrical Sensor Substitution

Aircraft window transparency laminates 12 include various originally installed electrical heat sensors 76, some used as primary and others as secondaries, to sense the temperature of the laminate 12 to thereby control the amount of electrical power flowing to the electrical buss bar 70. The electrical heat sensors 76 usually fail prior to the life of the laminate 12 and, without repair, thus necessitates the discarding of the entire laminate 12.

The electrical sensor repair method of the invention comprises steps for installing new heat sensors 78 in substitution for the original heat sensor 76 imbedded in the laminate 12 during the manufacture thereof and steps for installing still additional heat sensors to the "hotter" areas of the laminate 12 so as to minimize "hot spots" and the resulting damages to the laminate 12.

The technique of the method for installing new heat sensors 78 comprises the step of drilling a blind hole 80 in the edge of the laminate 12 at the same level of the original heat sensor 76. As noted earlier, the heat control sensor 78 preferrably comprises a thermister-type sensor composed of a strand of resistive wire whose resistance changes in inverse proportion to its temperature. Also preferably, the resistive wire is wound in a spiral having a diameter less than the diameter of the blind hole 80 such that the spiral wound resistive wire can be inserted into the hole with both leads brought out.

A slot 82 is then formed along the edge of the laminate 12 by a milling tool from the blind hole 80 to the electrical terminal connector 84.

The leads of the defective sensor 76 are disconnected and leads 88 of the new heat sensor 78 are connected to the connector 84 to allow the sensor 78 to be connected to the aircraft's power supply and control monitor (not shown). A new connector 90 may be provided consisting of a threaded fastener 92 positioned through a hole 94 drilled transversely through the laminate 12. Lock washers 96 and nuts 98 are installed on opposing ends of the threaded fastener 92 to rigidly secure it in place. The threaded fastener 92 thus allows the standard electrical lug to be secured thereto and thus connected to the aircraft's monitoring and power supply system.

An epoxy adhesive 86, preferably non-conductive, is injected into the hole 80 about the new heat sensor 78 to completely back fill the hole 80 and encapsulate the sensor 78 in the laminate 12. Additional epoxy 86 is used to fill the slot 82 to encapsulate the leads 88 therein.

Additional electrical heat sensors 78 may be positioned at desired areas of the transparency laminate 12, particularly if those areas which are recorded to be the "hot spots" of the laminate 12. More particularly, after the buss bar 70 and electrically conductive ply interconnect is repaired as described above, another series of photographic records may be taken, as described above, to determine the "hottest" areas of the laminate 12. Then, a new heat sensor 78 may be installed at one or more locations about the peripheral edge closest to such "hot spot". Since the new heat sensor 78 will register the hottest area of the laminate 12, the electrical power to the electrical buss bar 70 may be similarly regulated so that the "hot spot" will not become heated to such extent that it damages the transparency laminate 12. The additional heat sensor 78 positioned at the hottest area may then be used as the primary sensor in lieu of the substitution sensor.

The present disclosure includes that contained in the appended claims as well as that of the foregoing description. Although this invention has been described in this preferred form with a certain degree of particularity, it is understood that the present disclosure of the preferred form has been made only by way of example and that numerous changes in the specific steps of the ;method may be resorted to without departing from the spirit and scope of this invention.

Now that this invention has been described:
What is claimed is:

1. A repair method for repairing electrical interconnect between electrical buss bars and electrically conductive ply of a heatable laminate, comprising the steps of:

filling a syringe with an electrically conductive material, the syringe including a hypodermic needle affixed thereto;

inserting the needle into the laminate parallel to the conductive ply and along the surface thereof in alignment with the buss bar until the needle reaches the interconnect such that the needle moves over the buss bar to the area proximate the interconnect;

operating the syringe to inject an amount of the material into an area about the conductive ply; and withdrawing the needle.

2. The method as set forth in claim 1, wherein the step of inserting, operating and withdrawing the needle and syringe is repeated along the length of the buss bar.

3. The method as set forth in claim 2, further including the step of applying a heat sensitive material to a surface of the laminate and then applying electrical power to the bass bar to heat the laminate.

4. The method as set forth in claim 3, further including the step of using the heat sensitive material as a guide to determine the amount of material to be injected into the laminate along the length of the bass bar.

* * * * *